US012330439B2

(12) United States Patent
Madaschi et al.

(10) Patent No.: US 12,330,439 B2
(45) Date of Patent: Jun. 17, 2025

(54) LEVELER DEVICE OF SIGNATURES ON MOVABLE SADDLE OF BOOKBINDING SEWING MACHINE WITH GAS JET

(71) Applicant: Meccanotecnica S.p.A., Gazzaniga (IT)

(72) Inventors: Marco Madaschi, Torre de' Roveri (IT); Paolo Alberto Cornolti, Villa di Serio (IT)

(73) Assignee: Meccanotecnica S.p.A., Gazzaniga (IT)

( * ) Notice: Subject to any disclaimer, the term of this patent is extended or adjusted under 35 U.S.C. 154(b) by 142 days.

(21) Appl. No.: 17/788,881

(22) PCT Filed: Dec. 24, 2020

(86) PCT No.: PCT/EP2020/087861

§ 371 (c)(1),
(2) Date: Jun. 24, 2022

(87) PCT Pub. No.: WO2021/130362

PCT Pub. Date: Jul. 1, 2021

(65) Prior Publication Data

US 2023/0024367 A1 Jan. 26, 2023

(30) Foreign Application Priority Data

Dec. 27, 2019 (IT) ........................ 102019000025627

(51) Int. Cl.
*B42B 2/02* (2006.01)

(52) U.S. Cl.
CPC ..................................... *B42B 2/02* (2013.01)

(58) Field of Classification Search
CPC ........................................................ B42B 2/02
USPC ........................ 412/1, 6, 7, 9, 25, 33, 35, 38
See application file for complete search history.

(56) References Cited

U.S. PATENT DOCUMENTS

2019/0255871 A1* 8/2019 Maffeo ..................... B42B 2/02

FOREIGN PATENT DOCUMENTS

| | | | | |
|---|---|---|---|---|
| EP | 1477322 A1 | 11/2004 | | |
| IT | 201600076770 A1 | 1/2018 | | |
| WO | WO-2018015916 A2 * | 1/2018 | ............... | B42B 2/02 |

OTHER PUBLICATIONS

International Searching Authority, International Search Report and Written Opinion from PCT Application No., PCT/EP2020/087861, Mar. 31, 2021, pp. 1 through 12.

(Continued)

*Primary Examiner* — Justin V Lewis
(74) *Attorney, Agent, or Firm* — Bryan A. Santarelli; FisherBroyles, LLP

(57) ABSTRACT

A leveler device (200) is proposed for use in a bookbinding sewing machine (100) adapted to sew signatures (115) into book blocks (155) with one or more sewing threads (415). The leveler device (200) is used to level each signature (115) loaded onto amovable saddle (150). The leveler device (200) has at least one inlet (215) for receiving a gas jet and one or more nozzles (220) for ejecting the gas towards corresponding free ends of the threads (415) projecting from a last signature (115) of each completed bookblock (155). A bookbinding sewing machine (100) comprising the leveler device (200) is also proposed. Moreover, a corresponding method for operating a bookbinding sewing machine (100) is proposed.

20 Claims, 4 Drawing Sheets

(56) References Cited

OTHER PUBLICATIONS

Taiwanese Patent Office; Taiwanese Office Action dated Feb. 8, 2024; Taiwanese Application No. 11320423740; Title: "Leveler Device of Signatures on Movable Saddle of Bookbinding Sewing Machine With Gas Jet" (2024).

Chinese Patent Office; Chinese Office Action dated Jan. 16, 2024; Chinese Application No. 202080090743.6; "Gas jet binding sewing machine removable saddle signature leveler device" (2024).

* cited by examiner

LEVELER DEVICE OF SIGNATURES ON MOVABLE SADDLE OF BOOKBINDING SEWING MACHINE WITH GAS JET

This application claims priority to International Patent Application No. PCT/EP2020/087861 filed on Dec. 24, 2020, which claims priority to IT Patent Application No. 102019000025627 filed on Dec. 27, 2019.

TECHNICAL FIELD

The present disclosure relates to the bookbinding field. More specifically, this disclosure relates to bookbinding sewing machines.

TECHNOLOGICAL CONTEXT

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Bookbinding sewing machines are commonly used to sew signatures, also known as sections, to each other into (book) blocks for the production of corresponding books of sewn type. Particularly, for this purpose each signature to be sewn is loaded onto a movable saddle, which is then closed towards a sewing position thereof. The movable saddle is generally provided with a leveler device that levels the signature onto the movable saddle, so as to prevent the signature from moving away from the movable saddle by inertia during its movement. Once the movable saddle has reached the sewing position, it is sewn to a previous signature of a book block under formation. For this purpose, a series of needles and crochets form one or more stitchings between the signatures of the book block with corresponding (sewing) threads, which are supplied continuously by corresponding spools. Once a last signature of the bock block has been sewn, the book block is separated from the threads by cutting them; in this way, the book blocks are separated from each other.

Moreover, in order to avoid that the cut threads (i.e., corresponding free tails at the needles and corresponding free loops at the crochets) might return into the last signature (thereby loosening the corresponding stitchings and then compromising the compactness and the integrity of the book block during its next processing steps) a blind stitch, i.e., without any signature, is typically made after sewing the last signature.

The international application published with the No. WO-A-2018/015916 instead describes a technique for completing the book blocks without blind stitches. Briefly, for each thread a shuttle brings it to an intermediate position aligned with the corresponding free loop (along an advancement direction of the book blocks during their sewing). A thread-clamp brings a portion of the thread from the intermediate position through the free loop. The thread-clamp is actuated to block the thread, which is then cut. At this point, the thread-clamp pulls the (cut) thread away from the free loop, so as to tighten the free loop around the thread. As a result, it is possible to obtain a good compactness of the book blocks, at the same time with a high yield of the (bookbinding) sewing machine.

In any case, corresponding ends of the threads terminating the stitchings of each (completed) book block remain free outside the last signature, close to the needles and the crochets.

Therefore, the free ends of the threads that remain outside the last signature of the completed book block might enter into a signature of a next book block under formation. As a consequence, this signature of the next book block might be sewn with the last signature of the completed book block. In this case, the completed book block and the next book block are joined together.

However, any joined book blocks may hinder the next processing operations that are performed downstream their sewing (for example, transportation, attachment of soft/hard covers, and so on). This requires a manual intervention for separating the joined book blocks. Moreover, this may create corresponding malfunctionings in automated bookbinding lines wherein these processing operations may be performed (for example, in conveyors, perfect-binding machines and so on), down to their stop.

Alternatively, the free ends of the threads that remain outside the last signature of the completed book block might enter between two adjacent signatures thereof. In this case, the free ends of the threads are visible between corresponding pages of the resulting book when it is open for reading. This provides an unpleasant effect that worsen an aspect of the book.

All of the above has a detrimental effect on a yield and/or a quality of a production process of the books.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of adding a gas jet to the leveler device.

Particularly, an aspect provides a leveler device for use in a bookbinding sewing machine (adapted to sew signatures into book blocks with one or more sewing threads). The leveler device is used to level each signature loaded onto a movable saddle. The leveler device has at least one inlet for receiving a gas jet and one or more nozzles for ejecting the gas towards corresponding free ends of the threads projecting from a last signature of each completed book block.

A further aspect provides a bookbinding sewing machine comprising this leveler device.

A further aspect provides a corresponding method of operating a bookbinding sewing machine.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. In addition, orientations and related position references (such as upper, lower, lateral and so on) are to be understood in relation to a condition of use of the corresponding entities. Particularly.

DETAILED DESCRIPTION

Figure 1:
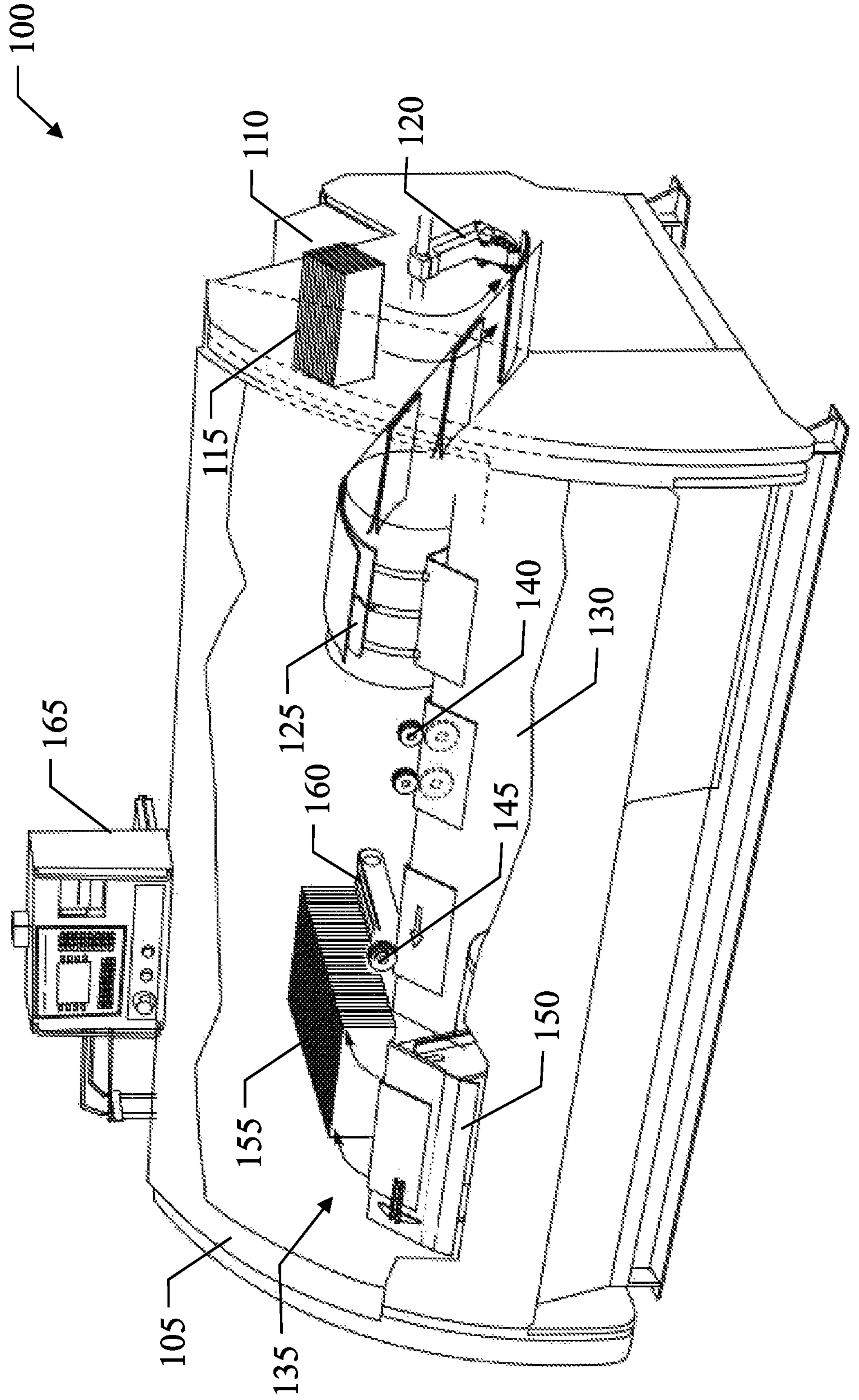
FIG. 1 shows a pictorial representation of a bookbinding sewing machine wherein the leveler device according to an embodiment of the present disclosure may be used.

With reference in particular to FIG. 1, a pictorial representation is shown of a (bookbinding) sewing machine 100 wherein a leveler device according to an embodiment of the present disclosure may be used.

The sewing machine 100 is used for sewing blocks of signatures to each other, so as to form book blocks for the production of corresponding books of sewn type (not shown in the figure); for example, each signature is formed by a printed sheet, which is folded one or more times to define different pages of the books.

The sewing machine 100 comprises a bearing frame 105 for its components, which is provided with a carter for covering them. Particularly, a hopper 110 is used to load a stack of signatures to be sewn, denoted with the reference 115 (ordered according to the book blocks to be formed). An extraction device 120 (for example, based on a pair of pliers and a series of suction cups) extracts the signatures 115 in succession from the bottom of the hopper 110 and provides them to an opening device 125; in turn, the opening device 125 (for example, based on a series of upper and lower suction cups) opens each signature 115 and places it astride a fixed saddle 130. The fixed saddle 130 conveys the signatures 115 to a sewing station 135. In detail, the fixed saddle 130 comprises a saddle plate (wedge-shaped, inverted-V-like) for resting the signatures 115; a chain with pushing pegs (not shown in the figure) is housed inside the saddle plate, so that the pegs project through a longitudinal slot of the saddle plate, at a vertex thereof, for pushing the signatures 115 (leftwards in the figure). The signatures 115 conveyed by the fixed saddle 130 cross a shaping station 140 and then reach a launching wheel 145, which accelerates each signature 115 so as to separate it from the previous ones and throw it individually over a movable saddle 150 of the sewing station 135 (in an open position aligned with the fixed saddle 130); the movable saddle 150 as well comprises a saddle plate (wedge-shaped, inverted-V-like) for resting the signatures 115, which has a longitudinal slot at a vertex thereof for the passage of (mechanical) members of the sewing station 135. Once the signature 115 has been loaded astride the movable saddle 150, the latter is raised to bring it towards a closed (sewing) position under a sewing head (not shown in the figure); the sewing head sews the signature 115 loaded on the movable saddle 150 with continuous (sewing) threads by a series of needles and crochets, starting a new book block if the signature 115 is the first one thereof or adding the signature 115 to a book block under formation otherwise; the movable saddle 150 then returns to the open position (by slipping out of the signature 115 just sewn) to repeat the same operations continually. As soon as each book block has been completed, the threads are cut to separate the book block therefrom. The book blocks so obtained, denoted with the reference 155, are deposited in succession onto an output conveyor 160 (to be provided to further bookbinding machines, not shown in the figure, which complete the corresponding books). A motor, not visible in the figure, drives the various (mechanical) members of the sewing machine 100 by means of corresponding transmission systems. Operation of the entire sewing machine 100 is managed by a control system 165 (for example, based on an industrial PC).

Figure 2:
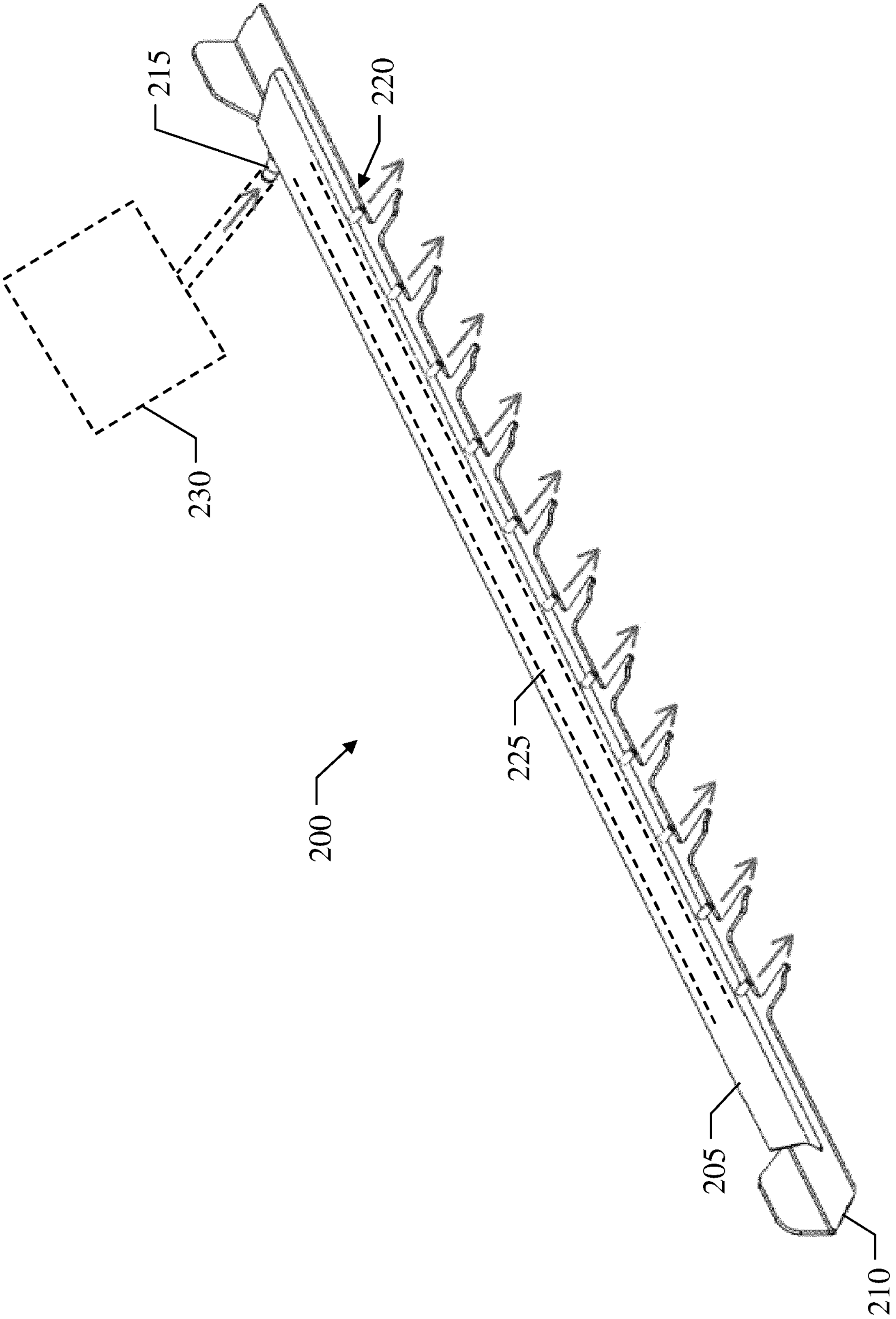
FIG. 2 shows a pictorial representation of the leveler device according to an embodiment of the present disclosure.

FIG. 2 shows a pictorial representation of the leveler device 200 according to an embodiment of the present disclosure.

The leveler device, or simply leveler 200 is a device that contains and accompanies each signature loaded on the movable saddle (not shown in the figure) during the movement of the movable saddle (and then of the signature with it) to its sewing position (movable saddle being closed); particularly, the leveler 200 prevents the signature from moving away from the movable saddle by inertia. For this purpose, the leveler 200 is mounted on the movable saddle slightly above its vertex; a distance of the leveler 200 from the vertex of the movable saddle may be regulated (for example, manually or automatically via the control system of the sewing machine) according to a thickness of the signature loaded thereon. The leveler 200 is shaped so as not to interfere with operation of the other components of the sewing station (not shown in the figure), i.e., the needles, the crochets, a sewing head segment and so on, and it is driven to move in synchrony with them during the sewing of the signature.

The leveler 200 has a main body 205 with an elongated shape (with substantially the same length as the one of the movable saddle) that implements its function; particularly, the main body 205 has an operative surface 210 (lower in operative condition) that defines a plate for acting on the signature being loaded on the movable saddle.

In the solution according to an embodiment of the present disclosure, the leveler 200 further comprises the following components. An inlet 215 (or more) is provided for receiving a gas jet, for example, an air blast (as shown by an arrow in the figure). One or more nozzles 220 are provided for ejecting the air (as shown by corresponding arrows in the figure). A channel 225 (or more) for conveying the air extends from the inlet 215 (for example, at an end thereof) to the nozzles 220 (distributed along it); for example, the leveler 200 has a hollow structure (closed at its ends) that defines the channel 225. The nozzles 220 are arranged (along the leveler 200) at every positions where free ends of the threads may be formed on the last signature of each book block after their cutting (according to the different formats of the signatures); for example, a nozzle 220 is provided for each needle and/or for each crochet. The nozzles 220 are oriented away from the signatures of a next book block under formation (if any), for example, towards the book block just completed (along an advancement direction thereof during the sewing).

A blasting system 230 of the sewing machine (shown in dashed lines in the figure) provides this air blast; for example, the blasting system 230 comprises a pump that delivers the air blast to the inlet 215 via a pipe. The blasting system 230 is configured to provide the air blast with duration, flow and pressure that are pre-determined or that may be customized by an operator via the control system of the sewing machine; for example, the flow/pressure depend on the threads (such as their material, stiffness, twisting and the like), the paper of the signatures, their punching for the needles/crochets and so on).

In this way, the air blast provided by the blasting system 230 is conveyed from the inlet 215 along the channel 225 to the nozzles 220, where it is ejected towards the free ends of the threads (which remain free outside the last signature of the book block just completed after their cutting). The air then moves the free ends of the threads away the signatures of the next book block under formation.

This avoids (or at least substantially reduces) the risk that the free ends of the threads might enter any signature of the next book block. As a consequence, there is avoided (or at least substantially reduced) the risk that any signature of the next book block might be sewn with the last signature of the completed book block, and then that the completed book block and the next book block might be joined together.

As a consequence, any next processing operations that are performed downstream the sewing (for example, transportation, attachment of soft/hard covers, and so on) are not adversely affected. This limits the need of manual interventions for separating the joined book blocks. Moreover, this limits corresponding malfunctionings in automated book-binding lines wherein these processing operations may be performed (for example, in conveyors, perfect-binding machines and so on), and especially their stops.

All of the above has a beneficial effect on a yield and a quality of a production process of the books.

This result is achieved in a very simple and cost-effective way. Indeed, for this purpose there is exploited the leveler device that is already available in the sewing machine (for another purpose). Therefore, the proposed solution may be applied with a few modifications of the sewing machine (without any need of studying complex movements and phases of new devices). Particularly, it is possible to provide the proposed solution as a modification (after—market) kit for application to existing sewing machines as well.

Figure 3:
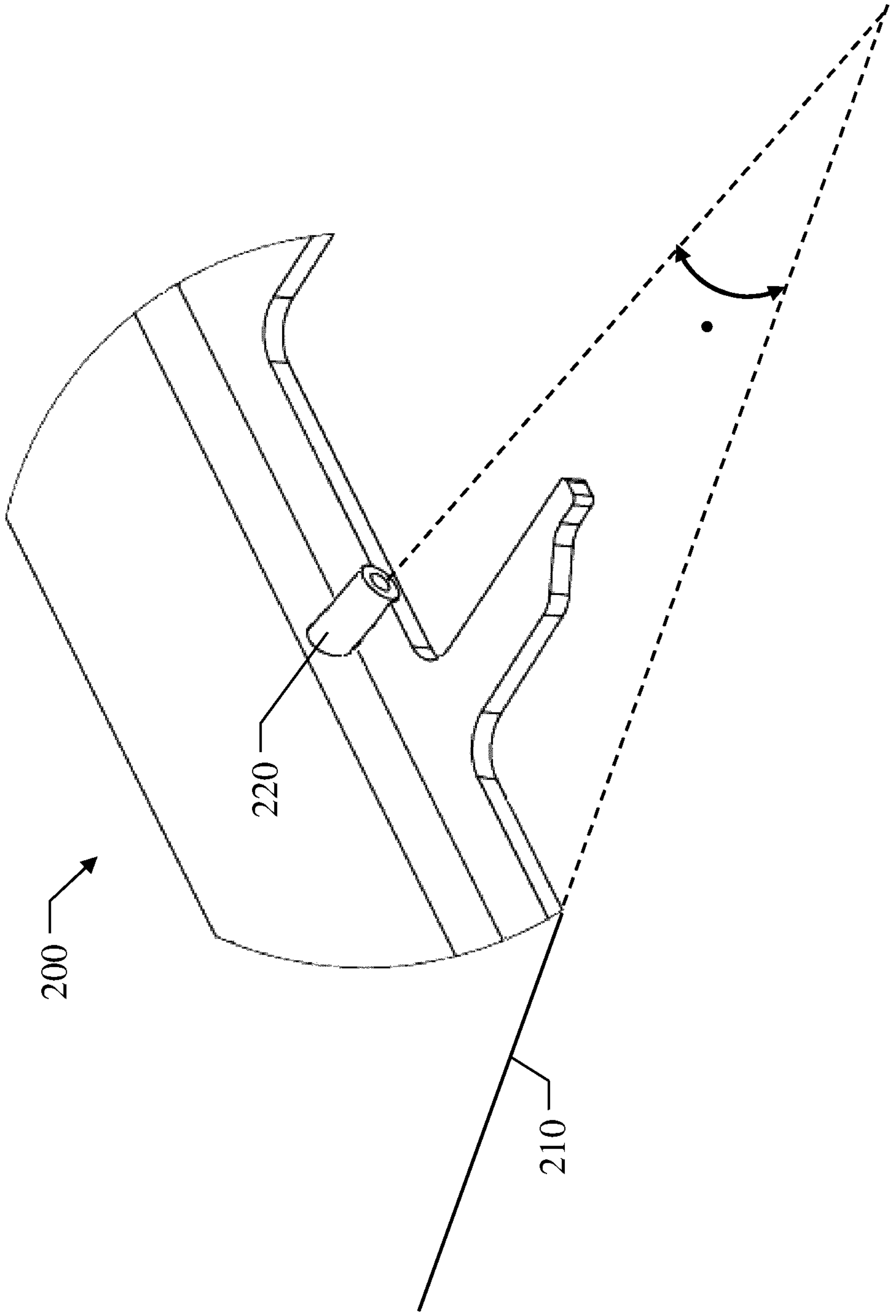
FIG. 3 shows a pictorial representation of a detail of the leveler device according to an embodiment of the present disclosure.

With reference now to FIG. 3, a pictorial representation is shown of a detail of the leveler 200 according to an embodiment of the present disclosure.

Particularly, each nozzle 220 (only one shown in the figure) is tilted downwards the movable saddle, and then towards the signature loaded thereon (not shown in the figure). For example, a longitudinal axis of the nozzle 220 (which defines a direction of the air blast being ejected by it) forms an angle $\alpha$ of 1-20°, preferably 5-15° and still more preferably 8-13°, such as 10° with the lower surface 210 of the leveler device 200. In this way, in operative condition, when the movable saddle is closed (in its sewing position) the longitudinal axis of the nozzles 220 is tiled downwards, forming the same angle $\alpha$ with a horizontal direction.

As a consequence, the air is ejected towards the last signature of the book block from above; the air then pushes the free ends of the threads (which remain free outside the last signature of the book block) against the book block, away from the possible next book block.

This further reduces the risk that the free ends of the threads might enter any signature of the next book block under formation, and then that any book blocks might remain joined together.

Figure 4:
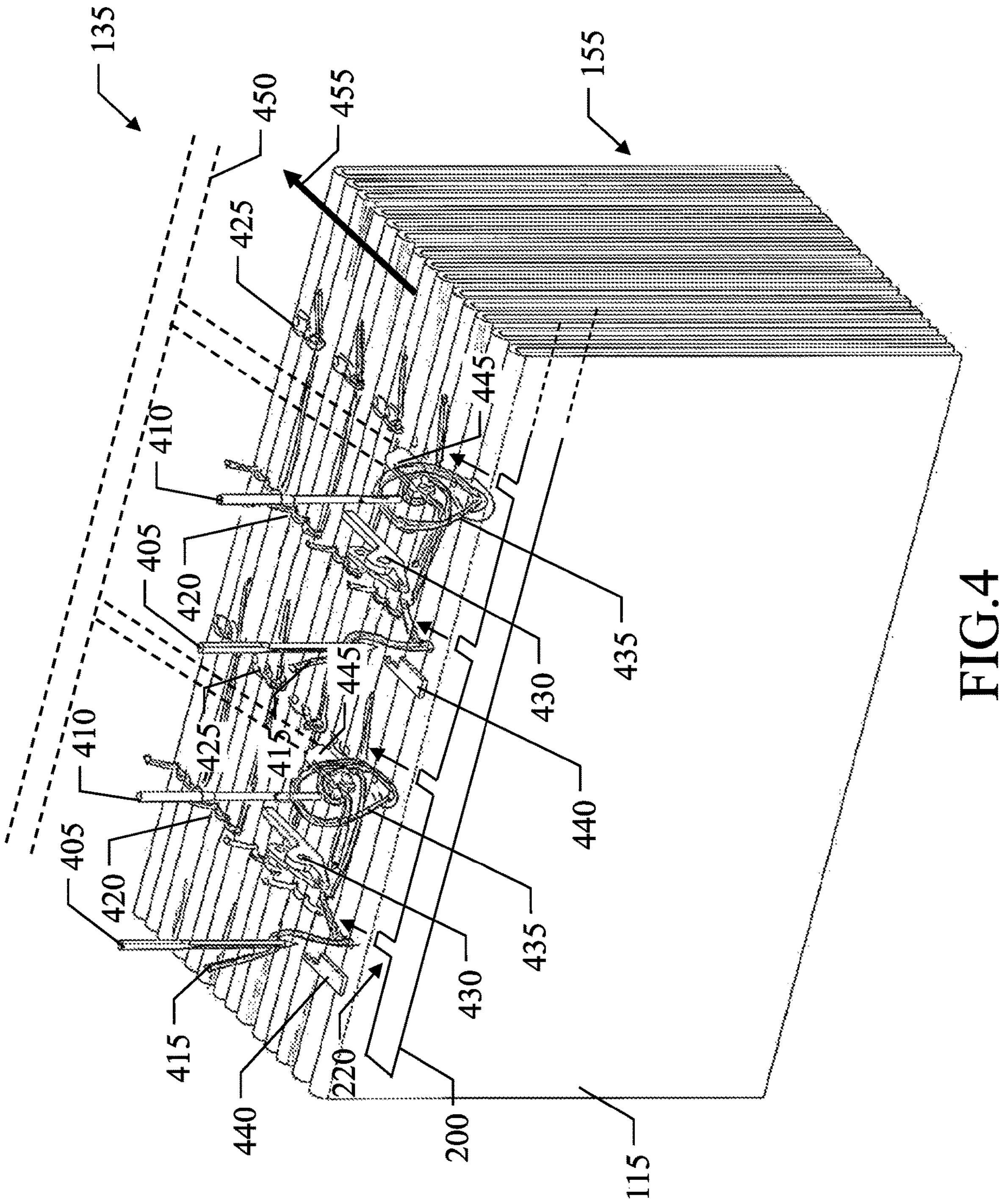
FIG. 4 shows an example of application of the leveler device according to an embodiment of the present disclosure.

With reference now to FIG. 4, an example is shown of application of the leveler device 200 according to an embodiment of the present disclosure.

Particularly, this example relates to the sewing of the signatures 115 into block 155 without blind stitches, as described in the above-mentioned international application published with the No. WO-A-2018/015916.

Briefly, the sewing station 135 comprises a series of needles 405 and a series of crochets 410 alternated to each other (for example, 8-15 pairs each formed by a needle 405 and a crochet 410, only two of them shown in the figure). Each needle 405 is formed by a stem that ends with a tip provided with an eye for inserting a corresponding thread 415, which is supplied continuously (for example, by a corresponding spool not shown in the figure); each crochet 410 is formed by a similar stem that instead ends with a hook for hooking a corresponding thread 415. The needles 405 and the crochets 410 cooperate to convey the threads 415 through the signatures 115, so as to form one or more stitchings that bridge between them; particularly, the stitchings comprise one or more rows of plain stitches 420 (formed by the needles 405) and one or more rows of looped stitches 425 (formed by the crochets 410), which are concatenated to each other. Moreover, the sewing station 135 comprises a series of cutters 430 (only two of them shown in the figure), each for cutting a corresponding thread 415 at the end of each book block.

At the beginning of the sewing of each book block 155, the threads 415 (coming from the corresponding spools) cross the eye of the corresponding needles 405 and end with a corresponding free tails (because just inserted into the needles 405 at the beginning of a job or because cut at the end of the sewing of a previous book block 155), while the hook needles 410 are free; later on, the threads 415 extend from the corresponding needles 405 to the corresponding plain stitches 420 formed onto a preceding signature 115, while corresponding free loops 435 previously formed by the threads 415 are held by the crochets 410.

Once a last signature 115 of each bock block 155 has been sewn, the book block 155 is separated from the threads 415 by cutting them. For this purpose, the sewing station 135 comprises a series of (auxiliary) shuttles 440 (only two of them shown in the figure), each for carrying a corresponding thread 415 from the needle 405 to the corresponding crochet 410 above the movable saddle (not shown in the figure). In addition, the sewing station 135 comprises a series of gripping devices, or thread-clamps 445 (only two of them shown in the figure), each for gripping and pulling a corresponding thread 415; particularly, the thread-clamp 445 combines the functions of a crochet with those of a pair of pliers, for hooking and blocking, respectively, the thread 415. The thread-clamps 445 are mounted onto a driving mechanism 450 arranged above the movable saddle in its closed position, so that in rest condition each clamp-thread 445 is beyond a corresponding crochet 410 along an advancement direction 455 of the book blocks 155 during their sewing (backwards in the figure), slightly below its tip. The driving mechanism 450, for example, based on a common support bar, implements an actuation mechanism for actuating the thread-clamps 445 in synchrony to open and close them (for example, with each thread-clamp 445 closed at rest and opened by acting on it) and a movement mechanism for moving of the thread-clamps 200 together (horizontally, in parallel and transversely to the advancement direction 455).

For each stitching, once a last signature 115 of the book block 155 has been sewn the thread 415 extends from the last signature 115 to the spool passing through the eye of the needle 405 while its free loop 435 is held by the crochet 410. At this point, the shuttle 440 is translated towards the crochet 410, thereby hooking the thread 415 and pulling it (from the spool) to an (intermediate) position behind the free loop 435 (along the advancement direction 455), for example, by moving along an S-like path to obtain a displacement (as the crow flies) oblique to the advancement direction 455. Subsequently, the thread-clamp 445 is actuated to open and it is translated contrary to the advancement direction 455, so as to be inserted into the free loop 435 up to hook the thread 415. The thread-clamp 445 is the actuated to close so as to block the thread 415 at a (gripping) point thereof. The thread-clamp 445 is then moved along the advancement direction 455 so as to be extracted from the free loop 435. As a result, a (closing) portion of the thread 415, comprising the gripping point, is brought within the free loop 435. After the sewing of the next block of signatures has been started, the cutter 430 is actuated, so as to cut the thread 415. After that, the thread-clamp 445 is translated laterally away from the crochet 410 (to the opposite side of the needle 405, rightwards in the figure) for a distance almost equal to the distance between the needle 405 and the crochet 410; as a consequence, the (cut) thread 415 is pulled (without sliding with respect to the thread-clamp 445 that blocks it) so as to tighten the free loop 435 around it. Subsequently, the thread-clamp 445 is actuated to open, thereby releasing the thread 415 that slips out thereof.

In the solution according to an embodiment of the present disclosure, the blasting system of the leveler 200 (not shown in the figure) provides the air blast, so that its nozzles 220 eject the air towards the free ends of the threads 415 that remain in the rows of plain stitches 420, at the needles 405, and at the rows of looped stitches 425, at the crochets 420 (as shown by corresponding arrows in the figure).

The blasting system may be driven (for example, by the control system of the sewing machine, not shown in the figure, or mechanically) to be always enabled during the sewing or only during a specific phase of each sewing cycle. For example, the blasting system is enabled when the threads 415 are cut (and their free ends are generated) and it is disabled when the needles 405 and the crochets 410 enters the first signature 115 of the next book block 155 (and then no risk exists any longer of bringing the free ends of the threats 415 inside it), for example, 1-2 s before and after them. This allows saving energy without adversely affecting reliability of the sewing machine.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms “substantially”, “about”, “approximately” and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a leveler device for use in a bookbinding sewing machine (comprising one or more needles and one or more crochets for sewing signatures into book blocks with one or more sewing threads, and a movable saddle for loading each current one of the signatures to be sewn). However, the bookbinding sewing machine may be of any type (see below).

In an embodiment, the leveler device is for levelling each current signature onto the movable saddle. However, the leveler device may be of any type (for example, based on a plate with or without prongs, and so on).

In an embodiment, the leveler device comprises at least one inlet for receiving a gas jet. However, the leveler device may comprise inlets in any number, of any shape and arranged at any position (for example, at an end, at the center and so on); moreover, the gas jet may be of any type (for example, air, ionized air, nitrogen and so on).

In an embodiment, the leveler device comprises one or more nozzles for ejecting the gas towards corresponding free ends of the threads (projecting from each current signature being a last one of the signatures of a completed one of the book blocks). However, the leveler device may comprise nozzles in any number, of any shape and arranged at any position (for example, at the needles/crochets, with any orientation and so on).

In an embodiment, the leveler device comprises at least one channel for conveying the gas extending from the inlet to the nozzles. However, the leveler device may comprise channels in any number, of any shape and arranged at any position (for example, internal, external and so on).

Further embodiments provide additional advantageous features, which may however be omitted at all in a basic implementation.

Particularly, in an embodiment the leveler device comprises a main body having a hollow structure defining the channel. However, the hollow structure may be of any type (for example, with any cross section, length and so on).

In an embodiment, the leveler device has an operative surface for acting on each current signature. However, the operative surface may have any shape and size.

In an embodiment, the nozzles are oriented for ejecting the gas towards the last signature of each completed book block along an ejection direction being tilted with respect to the operative surface. However, the possibility is not excluded of having the ejection direction oriented differently.

In an embodiment, the ejection direction forms an angle of 1-20° with the operative surface. However, the ejection direction may form any other angle with the operative surface.

An embodiment provides a bookbinding sewing machine. However, the bookbinding sewing machine may be of any type (for example, opening signatures already formed, folding flat sheets to form the signatures, with both functions, and so on).

In an embodiment, the bookbinding sewing machine comprises one or more needles and one or more crochets for sewing signatures into book blocks with one or more sewing threads. However, the needles and the crochets may be in any number (either the same or different) for sewing the signatures in any way (for example, with blind stitches, without blind stitches and so on); the signatures may be of any type (for example, simple, overlapped and so on) and they may be sewn into book blocks of any type (for example, each one comprising any number of signatures, with the addition of other elements, such as inserts, and so on).

In an embodiment, the bookbinding sewing machine comprises a movable saddle for loading each current one of the signatures to be sewn. However, the movable saddle may be of any type (for example, receiving the signatures from a fixed saddle, receiving the signatures directly, and so on).

In an embodiment, the bookbinding sewing machine comprises the leveler device of above being associated with the movable saddle for levelling each current signature onto the movable saddle. However, the leveler device may be associated with the movable saddle in any way (for example, mounted thereon with screws, levels and so).

In an embodiment, the bookbinding sewing machine comprises blasting means for providing the gas jet to the leveler device (thereby causing the nozzles to eject the gas towards corresponding free ends of the threads projecting from the last signature of each completed book block). However, the blasting means may be implemented in any way (for example, with a pump, an injector, either common for all the nozzles or dedicated to each one or each group thereof, and so on) and they may be operated in any way (for example, continuously during the sewing, selectively during each sewing cycle, with its enabling/disabling controlled either by software or mechanically, and so on).

Further embodiments provide additional advantageous features, which may however be omitted at all in a basic implementation.

In an embodiment, the leveler device comprises corresponding ones of the nozzles for the needles and/or corresponding ones of the nozzles for the crochets. However, the nozzles may be arranged in any way (for example, only for the needles, only for the crochets, for both of them, each one for a corresponding needle/crochet or a group thereof, and so on).

In an embodiment, in operative condition (when the movable saddle is closed in a sewing position), the nozzles are oriented for ejecting the gas towards the last signature of each completed book block from above along an ejection direction being tilted with respect a horizontal direction. However, the possibility is not excluded of having the ejection direction oriented differently.

In an embodiment, the ejection direction forms an angle of 1-20° downward with the horizontal direction. However, the ejection direction may form any other angle with the horizontal direction.

In an embodiment, the needles and the crochets are for forming one or more stitchings between the signatures of each book block; the stitchings comprise one or more plain stitches formed by the needles and one or more looped stitches formed by the crochets concatenated to each other (the looped stitches ending with corresponding free loops on the last signature of each completed book block). However, the plain stitches and the looped stitches may be formed in any way (for example, only with the normal stitching technique, only with the staggered stitching technique, selectively with both of them and so on).

In an embodiment, the bookbinding sewing machine comprises one or more shuttles corresponding to the sewing threads, each for bringing the corresponding sewing thread downstream the corresponding plain stitches along a formation direction thereof to an intermediate position aligned with the corresponding free loop along the advancement direction. However, the shuttles may be of any type (for example, mechanical, pneumatic and so on), each for bringing the corresponding sewing thread to any intermediate position (for example, behind or in front of the free loop, at any distance from it along the advancement direction, moving obliquely by forming any angle other than 90° with respect to the advancement direction, along a linear or non-linear path, and so on).

In an embodiment, the bookbinding sewing machine comprises one or more gripping devices corresponding to the sewing threads, each for bringing a closing portion of the corresponding sewing thread from the intermediate position through the corresponding free loop along the advancement direction (the closing portion consisting of a portion of the sewing thread downstream the corresponding plain stitches along the formation direction thereof). However, the gripping devices may be of any type (for example, with or without air blasts, with or without the possibility of disabling them and so on); the closing portion of each sewing thread may be brought through the free loop in any way (for example, by hooking it at any distance from the free loop, pulling it through the free loop to any distance therefrom and so on).

In an embodiment, the bookbinding sewing machine comprises an actuation mechanism for actuating the gripping devices each to open and close thereby blocking the corresponding sewing thread at a gripping point comprised in the closing portion thereof. However, the actuation mechanism may be of any type (for example, a common one for actuating all the gripping devices together, corresponding ones for actuating the gripping devices individually, acting to open the gripping devices when closed at rest, acting to close the gripping devices when open at rest, acting to both open and close the gripping devices, and so on) and it may be controlled for this purpose in any way (for example, opening the gripping device when normally closed to hook the sewing thread, hooking the sewing thread directly when the gripping device is normally open, closing the gripping device at any position, either before or after bringing the closing portion of the sewing thread through the free loop, and so on).

In an embodiment, the bookbinding sewing machine comprises one or more cutters corresponding to the sewing threads each for cutting the corresponding sewing thread being blocked downstream the gripping point thereof along the formation direction of the plain stitches. However, the cutters may be of any shape (for example, scissors-like, with telescopic structure and so on) and type (for example, active, passive and so on), and they may be used to cut the sewing threads in any way (for example, at any distance from the gripping point and so on).

In an embodiment, the bookbinding sewing machine comprises a moving mechanism for moving the gripping devices (each blocking the corresponding sewing thread being brought through the corresponding free loop) to pull the sewing thread being cut away from the free loop thereby tightening the free loop around the sewing thread. However, the moving mechanism may be of any type (for example, a common one for moving all the gripping devices together, corresponding ones for moving the gripping devices individually, and so on) for pulling the sewing threads in any way (for example, in any direction, to any extent and so on).

In an embodiment, the bookbinding sewing machine comprises the actuation mechanism for causing the gripping devices each to open thereby releasing the corresponding sewing thread being pulled. However, the gripping devices may be open in any way (see above) to release the sewing thread at any time after the free loop has been tightened (before it might interfere with the advancement of the corresponding book block).

In an embodiment, the bookbinding sewing machine comprises means for enabling the blasting means in response to the sewing threads being cut after sewing the last signature of each completed book block. However, the blasting means may be enabled at any time corresponding to the cutting of the threads (for example, at the same time, slightly before/after it and so on).

In an embodiment, the bookbinding sewing machine comprises means for disabling the blasting means in response to the needles entering a first one of the signatures of a next one of the book blocks following each completed book block. However, the blasting means may be disabled at any time corresponding to the start of the sewing the next book block (for example, at the same time, slightly after/before it and so on).

In general, similar considerations apply if the leveler and the bookbinding sewing machine each has a different structure or comprises equivalent components (for example, of different materials) or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

An embodiment provides a corresponding method for operating a bookbinding sewing machine. In an embodiment, the method comprises sewing blocks of signatures with one or more sewing threads by one or more needles and one or more crochets. In an embodiment, the method comprises loading each current one of the signatures to be sewn onto a movable saddle. In an embodiment, the method comprises levelling each current signature on the movable saddle by the leveler device of above being associated with the movable saddle. In an embodiment, the method comprises providing the gas jet to the leveler device to cause the nozzles to eject the gas towards corresponding free ends of the threads projecting from each current signature being a last one of the signatures of a completed one of the book blocks.

Further embodiments provide additional advantageous features, which may however be omitted at all in a basic implementation.

In an embodiment, the method comprises ejecting the gas towards the last signature of each completed book block from above along an ejection direction being tilted with respect to a horizontal direction when the movable saddle is closed in a sewing position.

In an embodiment, the method comprises ejecting the gas along the ejection direction forming an angle of 1-20° downward with the horizontal direction.

In an embodiment, the method comprises forming one or more stitchings between the signatures of each book block by the needles and the crochets. In an embodiment, the stitchings comprise one or more corresponding plain stitches formed by the needles and one or more corresponding looped stitches formed by the crochets concatenated to each other (the looped stitches ending with corresponding free loops on the last signature of each completed book block). In an embodiment, the method comprises bringing (by corresponding one or more shuttles) the sewing threads each downstream the corresponding plain stitches along a formation direction thereof to an intermediate position aligned with the corresponding free loop along the advancement direction. In an embodiment, the method comprises bringing (by one or more corresponding gripping devices) a closing portion of each of the sewing threads from the intermediate position through the corresponding free loop along the advancement direction (the closing portion consisting of a portion of the sewing thread downstream the corresponding plain stitches along the formation direction thereof). In an embodiment, the method comprises actuating the gripping devices each to open and close thereby blocking the corresponding sewing thread at a gripping point comprised in the closing portion thereof. In an embodiment, the method comprises cutting the sewing threads being blocked (by one or more corresponding cutters) each downstream the gripping point thereof along the formation direction of the plain stitches. In an embodiment, the method comprises moving the gripping devices (each blocking the corresponding sewing thread being brought through the corresponding free loop) to pull the sewing thread being cut away from the free loop thereby tightening the free loop around the sewing thread. In an embodiment, the method comprises actuating the gripping devices each to open thereby releasing the corresponding sewing thread being pulled.

In an embodiment, the method comprises enabling said providing the gas jet in response to the sewing threads being cut after sewing the last signature of each completed book block.

In an embodiment, the method comprises disabling said providing the gas jet in response to the needles entering a first one of the signatures of a next one of the book blocks following each completed book block.

However, similar considerations apply to the steps of the method as to the corresponding means of above used to implement them.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

The invention claimed is:

1. A leveler device for use in a bookbinding sewing machine, comprising one or more needles and one or more crochets for sewing signatures into book blocks with one or more sewing threads and a movable saddle for loading each of the signatures to be sewn, defining a current signature the leveler device for levelling the current signature onto the movable saddle, wherein the leveler device comprises:

at least one inlet for receiving a jet of a gas, one or more nozzles for ejecting the gas towards corresponding free ends of the sewing threads projecting from the current signature when the current signature is a last signature of the signatures of a completed one of the book blocks, and at least one channel for conveying the gas extending from the at least one inlet to the one or more nozzles.

2. The leveler device according to claim 1, further comprising a main body having a hollow structure defining the at least one channel.

3. The leveler device according to claim 2, wherein the leveler device has an operative surface for acting on the current signature, the one or more nozzles being oriented for ejecting the gas towards the last signature of each the completed book block along an ejection direction being tilted with respect to the operative surface.

4. The leveler device according to claim 1, further comprising:

an operative surface for acting on the current signature; and wherein the one or more nozzles are oriented for ejecting the gas towards the last signature of the completed book block along an ejection direction being tilted with respect to the operative surface.

5. The leveler device according to claim 4, wherein the ejection direction forms an angle of 1-20° with the operative surface.

6. A method for operating a bookbinding sewing machine, the method comprising:

sewing signatures into book blocks with one or more sewing threads by one or more needles and one or more crochets, loading each of the signatures to be sewn defining a current signature onto a movable saddle, levelling the current signature on the movable saddle by the leveler device according to claim 1 being associated with the movable saddle, and providing a jet of the gas to the leveler device to cause the one or more nozzles to eject the gas towards corresponding free ends of the sewing threads projecting from the current signature when the current signature is a last signature of the signatures of a completed one of the book blocks.

7. The method according to claim 6, further comprising:

ejecting the gas towards the last signature of each completed book block from above along an ejection direction being tilted with respect to a horizontal direction when the movable saddle is closed in a sewing position.

8. The method according to claim 7, further comprising: ejecting the gas along the ejection direction forming an angle of 1-20° downward with the horizontal direction.

9. The method according to claim 7, further comprising:

forming one or more stitchings between the signatures of each book block by the needles and the crochets, the stitchings comprising one or more corresponding plain stitches formed by the needles and one or more corresponding looped stitches formed by the crochets, wherein the plain stitches and the looped stitches are concatenated to each other and wherein each of the one or more plain stitches comprises a single portion of a corresponding one of the sewing threads extending between each pair of the signatures being adjacent, each of the looped stitches comprising a plurality of loops ending with a free loop of the loops on projecting from the last signature of the completed book block, bringing, by each of one or more shuttles, a corresponding one of the sewing threads downstream the one or more corresponding plain stitches along a formation direction thereof to an intermediate position aligned with the corresponding free loop along an advancement direction of the book blocks during the sewing thereof, bringing, by each of one or more gripping devices, a closing portion of a corresponding one of the sewing threads from the intermediate position through the corresponding free loop along the advancement direction, the closing portion consisting of a portion of the sewing thread downstream the corresponding plain stitches along the formation direction thereof, actuating each of the one or more gripping devices to open and to close thereby blocking the corresponding sewing thread at a gripping point comprised in the closing portion of the corresponding sewing thread, cutting a corresponding one of the sewing threads being blocked, by each of one or more cutters, downstream the gripping point thereof along the formation direction of the plain stitches, moving the one or more gripping devices, each of the one or more gripping devices blocking the corresponding sewing thread being brought through the corresponding free loop, to pull the corresponding sewing thread being cut away from the corresponding free loop thereby tightening the corresponding free loop around the corresponding sewing thread, and actuating each of the one or more gripping devices to open thereby releasing the corresponding sewing thread being pulled.

10. The method according to claim 7, further comprising:

enabling blasting means for providing the jet of the gas to the leveler device in response to the sewing threads being cut after sewing the last signature of the completed book block, and disabling the blasting means in response to the needles entering a first one of the signatures of a next one of the book blocks following the completed book block.

11. The method according to claim 6, further comprising:

forming one or more stitchings between the signatures of each book block by the needles and the crochets, the stitchings comprising one or more corresponding plain stitches formed by the needles and one or more corresponding looped stitches formed by the crochets, wherein the plain stitches and the looped stitches are concatenated to each other, and wherein each of the one or more plain stitches comprises a single portion of a corresponding one of the sewing threads extending between each pair of the signatures being adjacent, each of the looped stitches comprising a plurality of loops ending with a free loop of the loops projecting from the last signature of the completed book block, bringing, by each of one or more shuttles, a corresponding one of the sewing threads downstream the one or more corresponding plain stitches along a formation direction thereof to an intermediate position aligned with the corresponding free loop along an advancement direction of the book blocks during the sewing thereof, bringing, by each of one or more gripping devices, a closing portion of a corresponding one of the sewing threads from the intermediate position through the corresponding free loop along the advancement direction, the closing portion consisting of a portion of the sewing thread downstream the corresponding plain stitches along the formation direction thereof, actuating each of the one or more gripping devices to open and to close thereby blocking the corresponding sewing thread at a gripping point comprised in the closing portion of the corresponding sewing thread, cutting a corresponding one of the sewing threads being blocked, by each of one or more cutters, each downstream the gripping point thereof along the formation direction of the plain stitches, moving the one or more gripping devices, each of the one or more gripping devices blocking the corresponding sewing thread being brought through the corresponding free loop, to pull the corresponding sewing thread being cut away from the corresponding free loop thereby tightening the corresponding free loop around the corresponding sewing thread, and actuating each of the one or more gripping devices to open, thereby releasing the corresponding sewing thread being pulled.

12. The method according to claim 6, further comprising:

enabling blasting means for providing the jet of the gas to the leveler device in response to the sewing threads being cut after sewing the last signature of the completed book block, and disabling the blasting means in response to the needles entering a first one of the signatures of a next one of the book blocks following the completed book block.

13. A bookbinding sewing machine, comprising:

one or more needles and one or more crochets for sewing signatures into book blocks with one or more sewing threads, a movable saddle for loading each of the signatures to be sewn defining a current signature, a leveler device for levelling the current signature onto the movable saddle, the leveler device comprising at least one inlet for receiving a jet of a gas, one or more nozzles for ejecting the gas towards corresponding free ends of the sewing threads projecting from the current signature when the current signature is a last signature of the signatures of a completed one of the book blocks, and at least one channel for conveying the gas extending from the at least one inlet to the one or more nozzles, and blasting means for providing the jet of the gas to the leveler device thereby causing the one or more nozzles to eject the gas towards the corresponding free ends of the sewing threads projecting from the last signature of the completed book block.

14. The bookbinding sewing machine according to claim 13, wherein the leveler device comprises a corresponding nozzles for ejecting the gas towards a corresponding one of the sewing threads for each of the needles and/or a corresponding one of the nozzles for ejecting the gas towards a corresponding one of the sewing threads for each of the crochets.

15. The bookbinding sewing machine according to claim 14, wherein in operative condition, when the movable saddle is closed in a sewing position, the one or more nozzles are oriented for ejecting the gas towards the last signature of the completed book block from above along an ejection direction being tilted with respect a horizontal direction.

16. The bookbinding sewing machine according to claim 14, wherein the needles and the crochets are for forming one or more stitchings between the signatures of each book block, the one or more stitchings comprising one or more corresponding plain stitches formed by the needles and one or more corresponding looped stitches formed by the crochets, wherein the plain stitches and the looped stitches are concatenated to each other, and wherein each of the one or more plain stitches comprises a single portion of a corresponding one of the sewing threads extending between each pair of the signatures being adjacent, each of the looped stitches comprising a plurality of loops ending with a free loop of the loops projecting from the last signature of the completed book block, and wherein the bookbinding sewing machine comprises:

one or more shuttles each for bringing a corresponding one of the sewing threads downstream the one or more corresponding plain stitches along a formation direction thereof to an intermediate position aligned with the corresponding free loop along an advancement direction of the book blocks during the sewing thereof, one or more gripping devices each for bringing a closing portion of a corresponding one of the sewing threads from the intermediate position through the corresponding free loop along the advancement direction, the closing portion consisting of a portion of the sewing thread downstream the corresponding plain stitches along the formation direction thereof, an actuation mechanism for actuating each of the one or more gripping devices to open and to close thereby blocking the corresponding sewing thread at a gripping point comprised in the closing portion of the corresponding sewing thread, one or more cutters each for cutting a corresponding one of the sewing threads being blocked downstream the gripping point thereof along the formation direction of the plain stitches, a moving mechanism for moving the one or more gripping devices, each of the one or more gripping devices blocking the corresponding sewing thread being brought through the corresponding free loop, to pull the corresponding sewing thread being cut away from the corresponding free loop thereby tightening the corresponding free loop around the corresponding sewing thread, and the actuation mechanism for causing each of the one or more gripping devices to open thereby releasing the corresponding sewing thread being pulled.

17. The bookbinding sewing machine according to claim 13, wherein in operative condition, when the movable saddle is closed in a sewing position, the one or more nozzles are oriented for ejecting the gas towards the last signature of cash the completed book block from above along an ejection direction being tilted with respect to a horizontal direction.

18. The bookbinding sewing machine according to claim 17, wherein the ejection direction forms an angle of 1-20° downward with the horizontal direction.

19. The bookbinding sewing machine according to claim 13, wherein the needles and the crochets are for forming one or more stitchings between the signatures of each book block, the stitchings comprising one or more corresponding plain stitches formed by the needles and one or more corresponding looped stitches formed by the crochets, wherein the plain stitches and the looped stitches are concatenated to each other, and wherein each of the one or more plain stitches comprises a single portion of a corresponding one of the sewing threads extending between each pair of the signatures being adjacent, each of the looped stitches comprising a plurality of loops ending with a free loop of the loops projecting from the last signature of the completed book block, and wherein the bookbinding sewing machine comprises:

one or more shuttles each for bringing a corresponding one of the of the sewing threads downstream the one or more corresponding plain stitches along a formation direction thereof to an intermediate position aligned with the corresponding free loop along an advancement direction of the book blocks during the sewing thereof, one or more gripping devices each for bringing a closing portion of a corresponding one of the sewing threads from the intermediate position through the corresponding free loop along the advancement direction, the closing portion consisting of a portion of the sewing thread downstream the corresponding plain stitches along the formation direction thereof, an actuation mechanism for actuating each of the one or more gripping devices to open and to close thereby blocking the corresponding sewing thread at a gripping point comprised in the closing portion of the corresponding sewing thread, one or more each for cutting a corresponding one of the sewing threads head being blocked downstream the gripping point thereof along the formation direction of the plain stitches, a moving mechanism for moving the one or more gripping devices, each of the one or more gripping devices blocking the corresponding sewing thread being brought through the corresponding free loop, to pull the corresponding sewing thread being cut away from the corresponding free loop thereby tightening the corresponding free loop around the corresponding sewing thread, and the actuation mechanism for causing each of the one or more gripping devices to open thereby releasing the corresponding sewing thread being pulled.

20. The bookbinding sewing machine according to claim 13, further comprising:

means for enabling the blasting means in response to the sewing threads being cut after sewing the last signature of the completed book block and for disabling the blasting means in response to the needles entering a first one of the signatures of a next one of the book blocks following the completed book block.

* * * * *